United States Patent
Foohey

(10) Patent No.: US 10,351,036 B2
(45) Date of Patent: *Jul. 16, 2019

(54) STOWAGE MODULE MOUNTED TRAY TABLE WITH ARCED DEPLOYMENT MOTION

(71) Applicant: B/E Aerospace, Inc., Winston-Salem, NC (US)

(72) Inventor: Mark W. Foohey, Austin, TX (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/935,601

(22) Filed: Mar. 26, 2018

(65) Prior Publication Data

US 2018/0281652 A1    Oct. 4, 2018

Related U.S. Application Data

(60) Provisional application No. 62/478,650, filed on Mar. 30, 2017.

(51) Int. Cl.
| | |
|---|---|
| *B60N 3/00* | (2006.01) |
| *A47B 83/02* | (2006.01) |
| *B64D 11/06* | (2006.01) |
| *A47B 3/14* | (2006.01) |

(52) U.S. Cl.
CPC ............. *B60N 3/004* (2013.01); *A47B 83/02* (2013.01); *B60N 3/002* (2013.01); *B64D 11/06* (2013.01); *A47B 3/14* (2013.01); *B64D 11/0638* (2014.12)

(58) Field of Classification Search
CPC ..... A47B 83/02; A47B 83/0215; A47B 83/00; B64D 11/0638; B60N 3/002
USPC ....... 297/128, 119, 120, 145, 149, 150, 151, 297/160, 161, 162, 173; 108/103, 42
See application file for complete search history.

(56) References Cited

U.S. PATENT DOCUMENTS

| | | | | |
|---|---|---|---|---|
| 478,987 | A * | 7/1892 | Colby | A47B 83/02 297/142 |
| 854,298 | A * | 5/1907 | Matthews | A47C 7/68 297/161 |
| 1,196,050 | A * | 8/1916 | Watkins | A47C 7/70 297/162 |
| 2,452,183 | A * | 10/1948 | Clawson | A47C 7/70 297/161 |
| 2,980,165 | A * | 4/1961 | Stine | A61G 5/10 108/6 |
| 3,353,866 | A * | 11/1967 | Chapman | A47C 7/70 297/160 |
| 3,467,432 | A * | 9/1969 | Sullivan | A47C 7/70 16/364 |
| 3,751,108 | A * | 8/1973 | Bakanowsky | A47C 7/68 297/160 |

(Continued)

*Primary Examiner* — Jose V Chen
(74) *Attorney, Agent, or Firm* — Clements Bernard Walker PLLC

(57) ABSTRACT

A tray table assembly including a stowage module, a tray table configured to transition between a stowed position within the stowage module and a deployed position outside of the stowage module, and an assembly coupled to the tray table and the stowage module movable relative to the stowage module to provide arced deployment motion of the tray table as the tray table transitions between the stowed and deployed positions of the tray table.

9 Claims, 6 Drawing Sheets

(56) References Cited

U.S. PATENT DOCUMENTS

| | | | | |
|---|---|---|---|---|
| 5,547,247 | A * | 8/1996 | Dixon | A47C 7/70 |
| | | | | 297/145 |
| 7,296,523 | B1 * | 11/2007 | Yoon | A47B 95/00 |
| | | | | 108/103 |
| 7,874,614 | B2 * | 1/2011 | Figueras Mitjans | A47C 7/70 |
| | | | | 297/145 |
| 8,109,566 | B2 * | 2/2012 | Koh | A47C 7/70 |
| | | | | 297/145 |
| 8,596,206 | B2 * | 12/2013 | Legeay | B60N 3/002 |
| | | | | 108/137 |
| 8,668,257 | B2 * | 3/2014 | Wu | A47C 7/70 |
| | | | | 248/446 |
| 8,672,400 | B2 * | 3/2014 | Henderson | B60N 3/002 |
| | | | | 297/160 |
| 9,708,066 | B2 * | 7/2017 | Thompson | B60N 3/002 |
| 9,783,303 | B2 * | 10/2017 | Gagnon | B64D 11/06 |
| 9,815,556 | B2 * | 11/2017 | Helwig | B64D 11/0638 |
| 10,023,315 | B2 * | 7/2018 | Kuyper | A47B 5/006 |
| 2010/0019548 | A1 * | 1/2010 | Tajbakhsh | A47B 21/00 |
| | | | | 297/162 |
| 2013/0093221 | A1 * | 4/2013 | Ligonniere | B64D 11/06 |
| | | | | 297/173 |
| 2016/0375810 | A1 * | 12/2016 | Kong | B60N 2/793 |
| | | | | 297/145 |
| 2018/0281652 | A1 * | 10/2018 | Foohey | B60N 3/004 |

* cited by examiner

STOWAGE MODULE MOUNTED TRAY TABLE WITH ARCED DEPLOYMENT MOTION

RELATED APPLICATION AND INCORPORATION BY REFERENCE

This application claims priority from U.S. Application No. 62/478,650 filed Mar. 30, 2017, the entirety of which is incorporated by reference herein.

BACKGROUND

The inventive concepts disclosed herein relate generally to the field of deployable tray tables for use aboard aircraft and other passenger conveyances, and more particularly, to a tray table deployable from within a stowage module adapted to be positioned alongside a passenger seat, wherein tray table deployment follows an arced deployment path such that table orientation changes as the tray table transitions between the stowed and deployed positions of the tray table.

Passenger tray tables are known for use aboard aircraft and other conveyances for dining, working, etc. Tray tables are typically stowed as standard safety procedure during taxi, take-off and landing, and can be deployed as needed for use by passengers during flight.

Tray tables serving economy class seats can deploy from against the backside of a forward positioned seat. In the case of the first row of economy class or other seating arrangement lacking a similar forward-positioned seat, tray tables can deploy from against partitions walls or from within armrests positioned alongside the seat.

In the case of seatback and partition mounted tray tables, arms attached to the left and right sides of the tray table guide movement of the tray table between a stowed position in which the tray table is generally vertically-oriented, and a deployed position in which the tray table is generally horizontally-oriented. Fore and aft motion of the tray table can be achieved by allowing the tray table to slide relative to the supporting arms.

In the case of armrest mounted tray tables, which are also commonly used to serve business class and first class seats, these tray tables typically deploy from within or alongside the armrests by way of a complex hinge that allows multi-axis tray table movement. For example, the tray table may stow vertically within the armrest, pivot about a vertical axis to withdraw the tray table from the armrest, then fold or rotate to a horizontal position across the lap of the passenger.

While the above-described tray tables can be used to equip seats arranged into rows of like seats, such configurations are not capable of serving premium class seats such as those arranged into individual passenger suites. Passenger suites can include larger seating and living spaces, and therefore may require tray table deployment from more distant structures within the suite such as modules, dressers, tables, stowage compartments and other furniture. Accordingly, the present invention is directed to tray table deployment configurations suitable for accommodating various premium seating class arrangements.

SUMMARY

In one aspect, embodiments of the inventive concepts disclosed herein are directed to a tray table assembly including a stowage module, a tray table configured to transition between a stowed position within the stowage module and a deployed position outside of the stowage module, and an arced deployment rail coupled to each of the tray table and the stowage module, the arced deployment rail movable relative to the stowage module and the tray table movable relative to the arced deployment rail, the arced deployment rail arranged to provide arced deployment motion of the tray table as the tray table transitions between the stowed and deployed positions of the tray table.

In another aspect, the arced deployment motion of the tray table as the tray table transitions between the stowed and deployed positions of the tray table may cause the tray table to rotate.

In a further aspect, the tray table may rotate 90 degrees between the stowed and deployed positions of the tray table.

In a further aspect, a longitudinal axis of the stowage module may be parallel to a longitudinal axis of the tray table when the tray table is in the stowed position, and the longitudinal axis of the stowage module may be perpendicular to the longitudinal axis of the tray table when the tray table is in the deployed position.

In a further aspect, the arced deployment rail may include a track and the tray table may include a guide disposed on an underside of the tray table, the guide engaging the track such that the guide translates relative to the arced deployment rail and the tray table moves relative to the arced deployment rail at a beginning or an end of tray table movement in either direction.

In a further aspect, the arced deployment rail may include elongate side rails continuous along opposing sides thereof configured to constrain and guide the arced deployment rail as the arced deployment rail travels horizontally between spaced sets of horizontally-oriented wheels rotationally mounted on the stowage module.

In a further aspect, each set of horizontally-oriented wheels may include three wheels, wherein first and second wheels may be disposed radially outward of arced motion of the arced deployment rail and a third wheel may be disposed radially inward of the arced motion of the arced deployment rail, and wherein each of the first, second and third wheels is rotationally mounted on a post.

In a further aspect, the spaced sets of horizontally-oriented wheels include at least three spaced sets of horizontally-oriented wheels, and wherein the arced deployment rail is at all times engaged with the at least two spaced sets of the at least three spaced sets of horizontally-oriented wheels to constrain arced deployment rail motion.

In a further aspect, the assembly may include a first stop disposed at one end of the arced deployment rail to limit translation of the guide relative to the arced deployment rail, and a second stop disposed at an opposing end of the arced deployment rail to limit translation of the arced deployment rail relative to the stowage module.

In a further aspect, a combined height of the tray table and the arced deployment rail may be between 1" and 1.75".

In another aspect, the inventive concepts disclosed herein are directed to a tray table assembly including a stowage module, a tray table configured to transition between a stowed position within the stowage module and a deployed position outside of the stowage module, and a linkage assembly coupled to each of the tray table and the stowage module, the linkage assembly including a drive link movable relative to the stowage module and constrained to follow an arced path along the stowage module such that the tray table rotates as the tray table transitions between the stowed and deployed positions of the tray table.

In another aspect, the tray table may rotate 90 degrees between the stowed and deployed positions of the tray table.

In a further aspect, a longitudinal axis of the stowage module may be parallel to a longitudinal axis of the tray table when the tray table is in the stowed position, and the longitudinal axis of the stowage module may be perpendicular to the longitudinal axis of the tray table when the tray table is in the deployed position.

In a further aspect, the linkage assembly may include a plurality of links and drive link motion relative to the stowage module may be constrained to follow two spaced arcs arranged to converge in a direction of tray table deployment and diverge in a direction of tray table stowage.

In a further aspect, the drive link and the tray table may rotate together in a first direction as the tray transitions toward the deployed position, and the drive link and the tray table may rotate together in a second direction, opposite the first direction, as the tray table transitions toward the stowed position.

In a further aspect, at least one of the radii of the two spaced arcs, spacing between the two spaced arcs, and drive link length may determine arc path and path length of the drive link.

In a further aspect, the assembly may include an arced rail disposed on an underside of the tray table adapted to travel along a guide atop one end of the linkage assembly.

In a further aspect, linkage assembly translation may be guided and constrained by spaced sets of horizontally-oriented wheels rotationally mounted on the stowage module.

In a further aspect, each spaced set of horizontally-oriented wheels may include three wheels, wherein first and second wheels are disposed radially outward of a curved link of the linkage assembly and a third wheel is disposed radially inward of the curved link of the linkage assembly, and wherein each of the first, second and third wheels is rotationally mounted on a post.

In a further aspect, the spaced sets of horizontally-oriented wheels may constrain tray table motion directly to the curved link.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

The inventive concepts are described hereinafter with reference to the accompanying drawings in which exemplary embodiments are shown. However, the inventive concepts may be embodied in many different forms and should not be construed as limited to the representative embodiments set forth herein.

Embodiments of tray table assemblies for controlling tray table deployment motion are disclosed herein. Such embodiments are particularly well suited for conveyance applications where seatback and/or armrest tray table mounting is not possible and therefore an alternative tray table mounting solution is needed. Such embodiments are particularly advantageous in that the assemblies disclosed herein may be modified in curvature and/or component length to achieve a customized deployment path for the tray table to accommodate any angular relationship between the longitudinal seat axis and the structure from which the tray table deploys, as well as any distance between the passenger seat and structure. The tray table embodiments disclosed herein are further advantageous in that vertical component stacking is minimized to achieve a minimum vertical profile.

Figure 1:
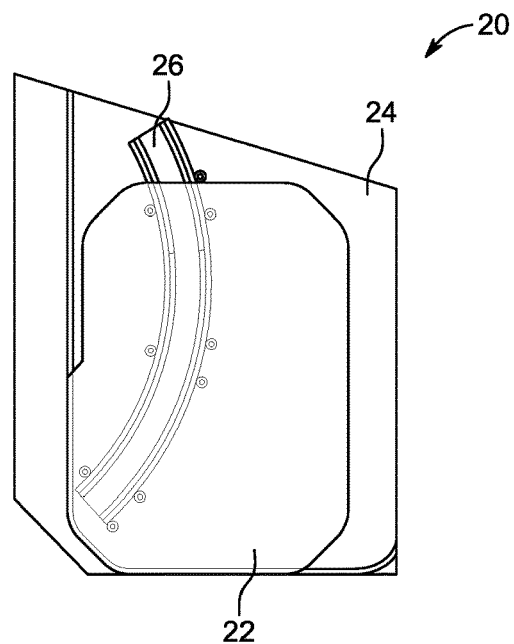
FIG. 1 is a top plan view of a tray table assembly according to a first embodiment.

FIG. 1 shows a tray table assembly 20 according to a first embodiment of the invention. The tray table assembly 20 generally includes a tray table 22, shown in transparency for clarity, a stowage module 24, and an arced deployment rail 26 interconnecting the tray table 22 and the stowage module 24. The tray table 22 may be a generally flat, planar tray table that can have rounded corners as shown. The tray table 22 can be made of durable lightweight plastics or like materials commonly used aboard aircraft, and can have conventional features such as a raised perimeter lip to maintain items on the tabletop and/or a recessed cup holder.

The term "stowage module" as used herein generally refers to any structure positioned in proximity to a passenger seat served by the tray table assembly 20, and within or upon which the tray table 22 stows and deploys apart therefrom. Suitable examples of stowage modules include, but are not limited to, consoles, tables, cabinets, dressers, partitions and monuments. In one embodiment, the stowage module 24 includes an elongate horizontal slot or recess that opens through a side of the stowage module from which the tray table 22 deploys outward. When fully stowed, the tray table 22 can be entirely received within the slot or recess of the stowage module 24 such that the tray table is contained within the bounds of the stowage module 24. A latch, handle or mechanical or electrically-actuated assist can be used to deploy the tray table 22 from within the slot. The assembly can further include a latch or lock to prevent unintentional tray table deployment.

Figure 2:
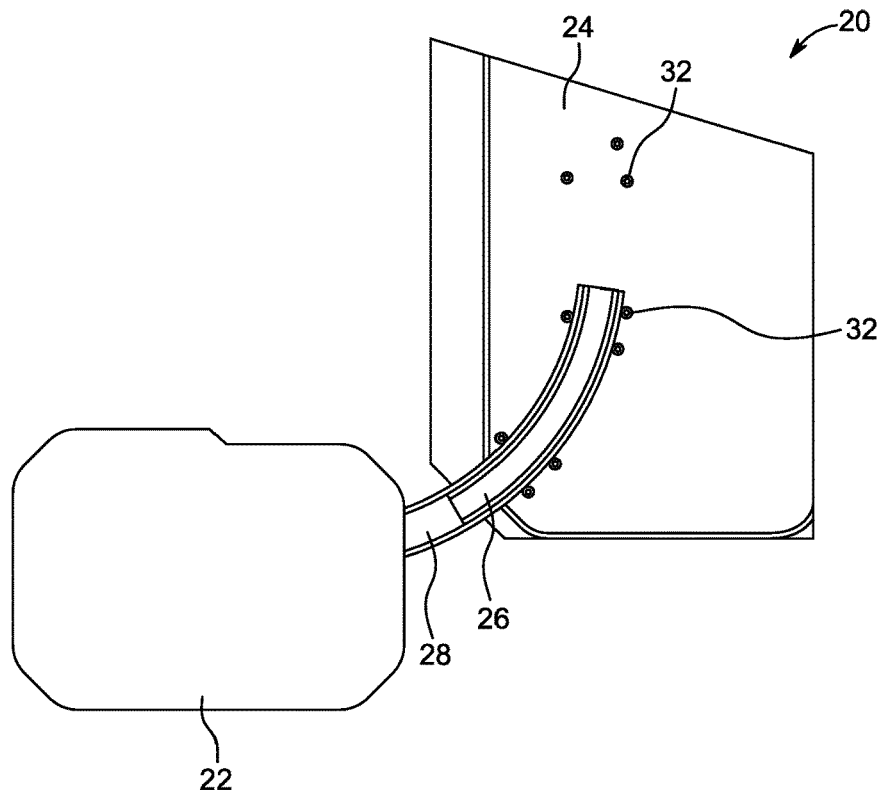
FIG. 2 is a top plan view of the tray table assembly of FIG. 1 showing the tray table fully deployed.

FIG. 2 shows the tray table 22 in a deployed position, fully deployed from within the stowage module 24. As the tray table 22 transitions between the fully stowed position shown in FIG. 1 and the fully deployed position shown in FIG. 2, it can be seen comparing the two figures and following the change in table orientation that deployment follows an arced path. Specifically, the tray table 22 follows an arced path such that the tray table 22 rotates 90 degrees, or thereabouts, between the fully stowed and fully deployed positions of the tray table. The 90 degree or similar andular rotation can be utilized in applications where the longitudinal seat axis and longitudinal stowage compartment axis, or at least the longitudinal axis of the slot of the stowage compartment, are parallel. In this configuration, the arced motion and try table rotation positions the longitudinal tray table axis perpendicular to the longitudinal seat axis when the tray table 22 is fully deployed, positioning the tray table 22 directly forward of the seated passenger in an ergonomic position for dining and/or working.

Figure 3:
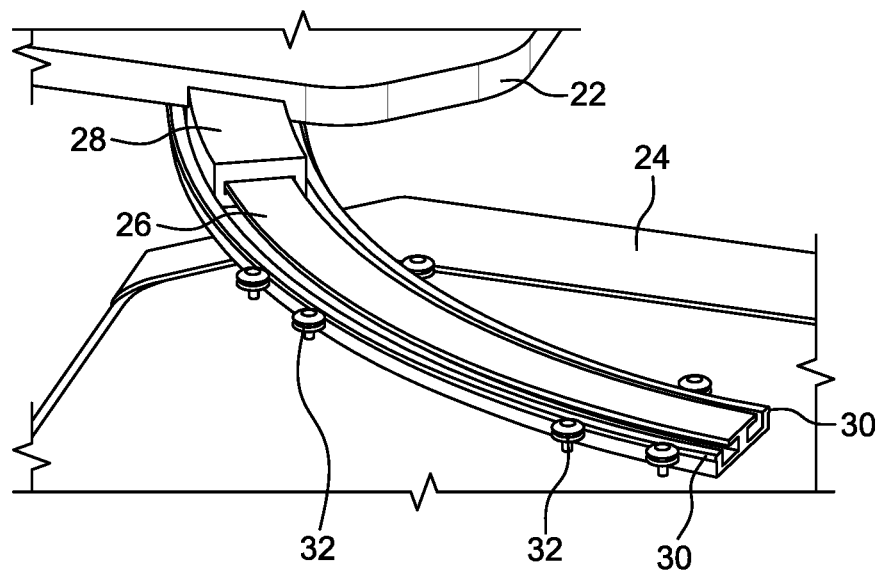
FIG. 3 is a detailed perspective view of the tray table assembly of FIG. 1.

The arced motion is achieved and controlled by the arced deployment rail 26. Referring to FIGS. 1-3, the arced deployment rail 26 can be a unitary T-style track wherein a C-shaped guide 28 on the underside of the tray table 22 engages the T-style track such that translational motion therebetween is permitted while the C-shaped guide 28 is prevented from being pulled apart vertically and separated from the arced deployment rail. This configuration further allows telescoping movement between the tray table 22 and the arced deployment rail 26 that can occur at the beginning or end of tray table movement in either direction.

The arced deployment rail 26 defines elongate side rails 30 continuous along opposing sides of the rail that constrain and guide the arced deployment rail 26 as the rail travels horizontally between spaced sets of horizontally-oriented wheels 32, for example, V-groove wheels. The wheels 32, for example, can be grouped into sets of three wheels, with two wheels of each group disposed radially outward of the arced motion and a single wheel of the group disposed radially inward of the arced motion. Each individual wheels 32 can be rotationally supported on a post such that each wheel rotation axis is vertical.

A stop can be provided at one or both ends of the arced deployment rail 26 to limit translation of the C-shaped guide 28 relative to the arced deployment rail 26 and/or the arced deployment rail 26 relative to the stowage module 24. In embodiments where the tray table 22 rotates a predetermined amount, for example 90 degrees, between the fully stowed and fully deployed positions of the tray table, each set or groups of wheels 32 can be spaced apart from another set such that at all times the arced deployment rail 26 is engaged with at least two sets of wheels thereby constraining and stabilizing rail motion.

Figure 4:
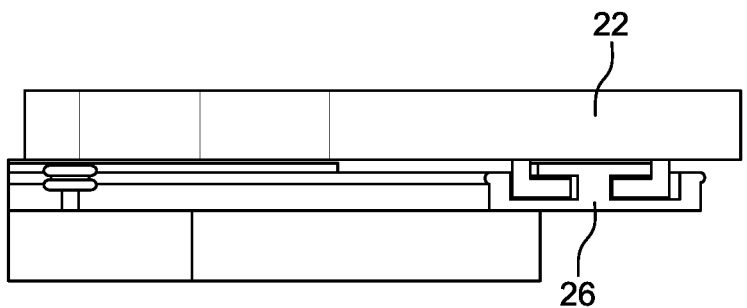
FIG. 4 is a side elevation view showing the vertical profile of the tray table assembly.

FIG. 4 shows the vertical profile or total height of the tray table assembly 20 according to the first embodiment, wherein the tray table 22 has a thickness from about 0.5" to about 1", more preferably about 0.75", and the arced deployment rail 26 has a thickness of about 0.5" to about 0.75", more preferably about 0.55", for a combined thickness of about 1" to about 1.75", more preferably about 1.25". Other thicknesses are envisioned, with a preferred vertical profile kept at the minimum necessary to achieve stability and rigidity.

Figure 5:
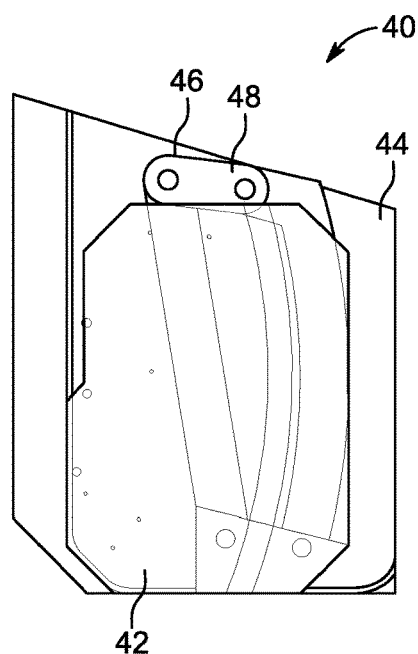
FIG. 5 is a top plan view of a tray table assembly according to a second embodiment.

FIG. 5 shows a tray table assembly 40 according to a second embodiment. The tray table assembly 40 generally includes a tray table 42, a stowage module 44, and a multi-link assembly 46 coupling the tray table and the stowage module. Like the first embodiment discussed above, the tray table 42 may be a generally flat, planar table that can be made from durable lightweight plastics or like materials commonly used aboard aircraft. The stowage module 44 again refers generically to any structure positioned in proximity to a passenger seat served by the tray table assembly 40, and within or upon which the tray table 22 stows and deploys apart therefrom.

Figure 6:
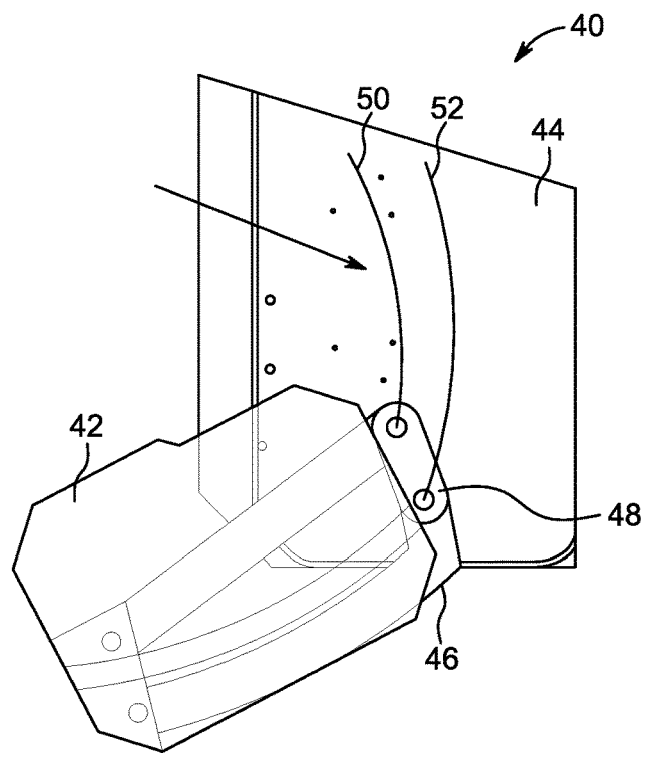
FIG. 6 is a top plan view of the tray table assembly of FIG. 5 showing the tray table partially deployed.
Figure 7:
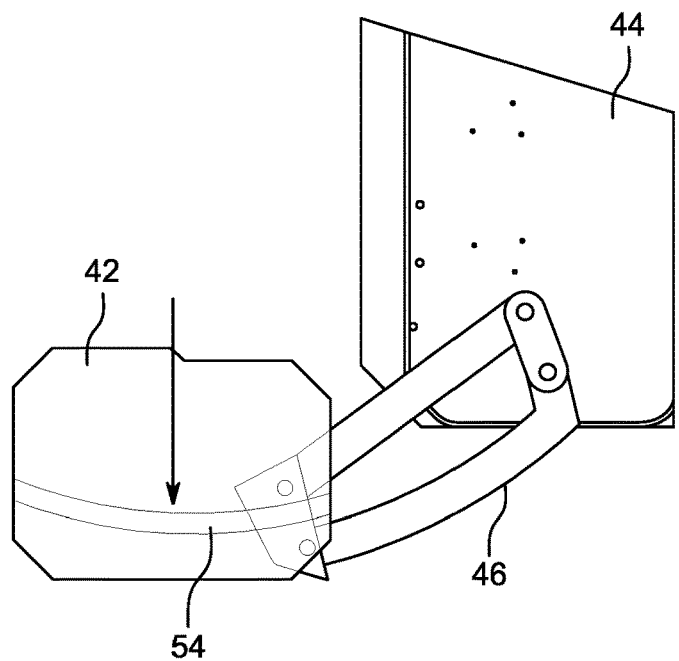
FIG. 7 is a top plan view of the tray table of FIG. 5 showing the tray table fully deployed.
Figure 8:
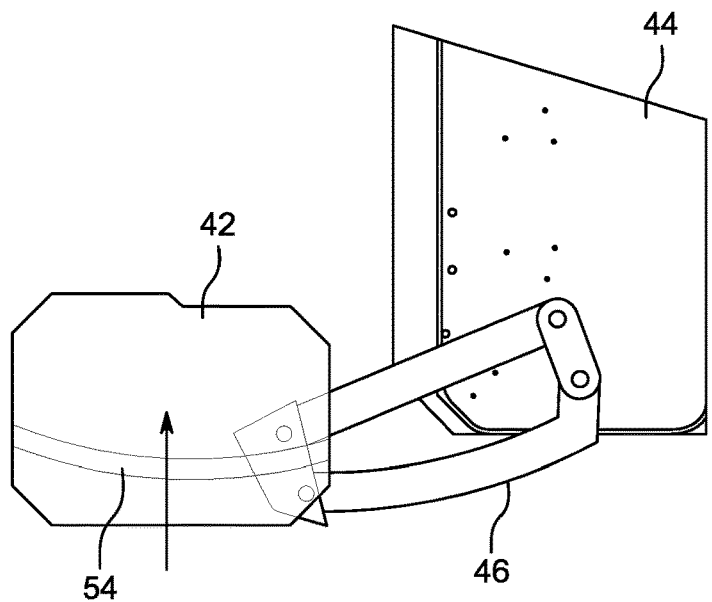
FIG. 8 is a top plan view of the tray table assembly of FIG. 5 showing fore and aft table translation.

FIG. 5 shows the tray table 42 fully stowed and entirely contained within the bounds of the stowage module 44. FIG. 6 shows the tray table 42 partially deployed from within the stowage module 44 and with a longitudinal axis of the tray table 42 at an angle to the longitudinal axis of the stowage module 44. FIG. 7 shows the tray table 42 fully deployed and positioned outside of the stowage module 44.

As the tray table 42 transitions from the fully stowed position shown in FIG. 5 to the partially deployed position shown in FIG. 6, and from the partially deployed position shown in FIG. 6 to the fully deployed position shown in FIG. 7, it can be seen by comparing the figures and following the change in table orientation that deployment also follows an arced path. Specifically, the tray table 42 follows an arced path such that the tray table 42 rotates 90 degrees between the fully stowed and fully deployed positions. Such 90 degree rotation is suitable in applications where the longitudinal seat axis and longitudinal stowage compartment axis, or at least the longitudinal axis of the slot of the stowage compartment, are parallel. Such arced motion and 90 degree rotation positions the longitudinal tray table axis perpendicular to the longitudinal seat axis when the tray table 42 is fully deployed as shown in FIG. 5.

Arced motion is achieved and guided by the multi-link assembly 46 that generally includes a plurality of links stabilizing fixed relative to one another and arranged generally in the shape of a parallelogram. The parallelogram shape is provided for stability and maintained as the drive link 48 is constrained to follow two spaced arcs, indicated at reference numerals 50 and 52 in FIG. 6, that converge in the direction of tray table deployment and diverge in the direction of tray table stowage. The convergence of the two arcs 50, 52 in the direction of tray table deployment causes the drive link 48 to rotate (e.g., clockwise) as the drive link 48 translates relative to the stowage module 46, thereby causing the tray table supported thereon to rotate in the same direction as the drive link 48. Stowing the tray table 42 causes the drive link 48 to rotate in the opposite direction (e.g., counterclockwise) as deployment, thereby rotating the tray table 42 in the same direction as the drive link 48.

The radii of the two arcs 50, 52, the spacing between the two arcs 50, 52, and drive link 48 length can be customized to determine the arc path and path length. Linkage assembly guidance and constrained motion thereof can be achieved using a spaced wheel and rail arrangement as described above in connection with the first embodiment.

As best shown in FIG. 7, the tray table 42 can be configured to translate relative to the underlying multi-link assembly 46 to complete the final deployment motion and bring the tabletop directly forward of the seated passenger. Translation of the tray table 42 relative to the multi-link assembly 46 can be achieved by way of an arced rail 54 disposed on the underside of the tray table that travels along a guide atop one end of the multi-link assembly 46. Although optional, the tray table 42 can further be configured to translate fore and aft relative to the multi-link assembly 46 to provide adjustability in fore and aft positioning for generally adjustability and/or to facilitate seat egress/ingress.

Figure 9:
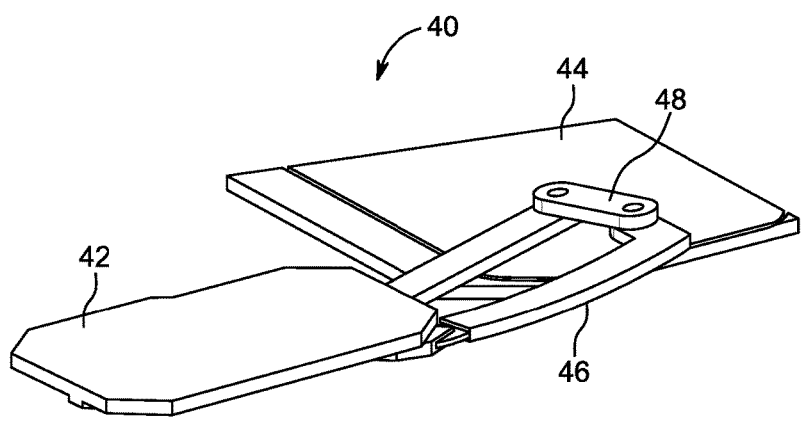
FIG. 9 is a top perspective view of the tray table assembly of FIG. 5.
Figure 10:
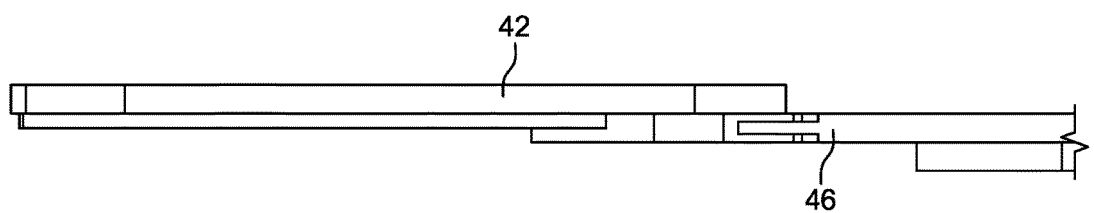
FIG. 10 is a side elevation view showing the vertical profile of the tray table assembly.

FIG. 9 is a perspective view of the tray table assembly 40 showing vertical stacking of the components, while FIG. 10 shows exemplary thicknesses of the tray table 42 and the multi-link assembly 46 to achieve a combined low vertical profile.

Figure 11:
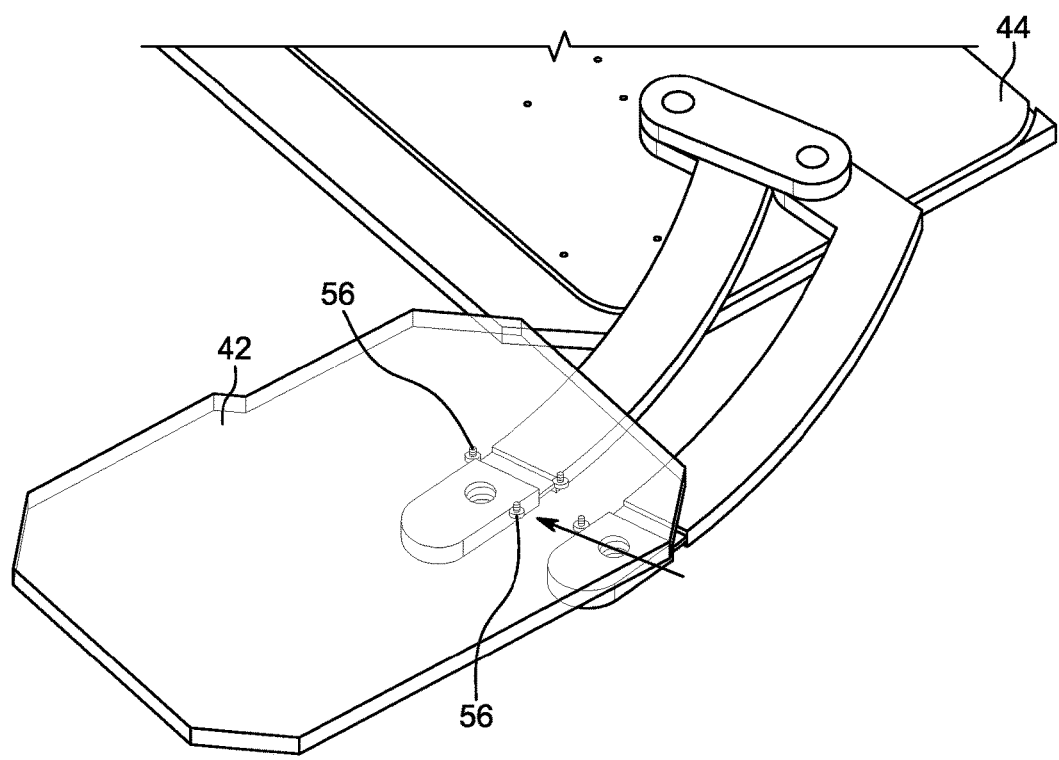
FIG. 11 is a top perspective view of the tray table assembly of FIG. 5 showing tray table motion constraining features.

FIG. 11 shows a sliding parallelogram variant smaller as compared to that shown in FIGS. 5-10, and including v-groove wheels 56 that constrain tray table motion directly to the curved parallelogram links, wherein the wheels 56 drive the parallelogram links to the neutral position.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A tray table assembly, comprising:
a stowage module;
a tray table movable between a stowed position within the stowage module and a deployed position outside of the stowage module; and
an arced deployment rail interconnecting the tray table and the stowage module, the arced deployment rail having a first end movably engaged with the stowage module and a second end movably engaged with the tray table,
wherein the tray table is movable by arced deployment motion relative to the stowage module between the stowed position and deployed position by at least one of translational motion of the arced deployment rail relative to the stowage module and translational motion of the tray table relative to the arced deployment rail.

2. The tray table assembly of claim 1, wherein the arced deployment motion of the tray table as the tray table transitions between the stowed and deployed positions of the tray table causes the tray table to rotate.

3. The tray table assembly of claim 2, wherein the tray table rotates 90 degrees between the stowed and deployed positions of the tray table.

4. The tray table assembly of claim 1, wherein a longitudinal axis of the stowage module is parallel to a longitudinal axis of the tray table when the tray table is in the stowed position, and the longitudinal axis of the stowage module is perpendicular to the longitudinal axis of the tray table when the tray table is in the deployed position.

5. The tray table assembly of claim 1, wherein the arced deployment rail comprises a track and the tray table comprises a guide disposed on an underside of the tray table, the guide engaging the track such that the guide translates relative to the arced deployment rail and the tray table moves relative to the arced deployment rail at a beginning or an end of tray table movement in either direction.

6. The tray table assembly of claim 1, wherein the arced deployment rail comprises elongate side rails continuous along opposing sides thereof configured to constrain and guide the arced deployment rail as the arced deployment rail travels horizontally between spaced sets of horizontally-oriented wheels rotationally mounted on the stowage module.

7. The tray table assembly of claim 6, wherein each set of horizontally-oriented wheels comprises three wheels, wherein first and second wheels are disposed radially outward of arced motion of the arced deployment rail and a third wheel is disposed radially inward of the arced motion of the arced deployment rail, and wherein each of the first, second and third wheels is rotationally mounted on a post.

8. The tray table assembly of claim 6, wherein the spaced sets of horizontally-oriented wheels comprise at least three spaced sets of horizontally-oriented wheels, and wherein the arced deployment rail is at all times engaged with the at least two spaced sets of the at least three spaced sets of horizontally-oriented wheels to constrain arced deployment rail motion.

9. The tray table assembly of claim 1, wherein a combined height of the tray table and the arced deployment rail is between 1" and 1.75".

\* \* \* \* \*